(12) United States Patent
Sawada

(10) Patent No.: US 8,615,604 B2
(45) Date of Patent: Dec. 24, 2013

(54) INFORMATION PROCESSING APPARATUS, INFORMATION PROCESSING SYSTEM AND COMPUTER READABLE MEDIUM FOR MAINTAINING COMMUNICATION WHILE IP ADDRESSES CHANGE

(75) Inventor: Takahiro Sawada, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 761 days.

(21) Appl. No.: 12/368,750

(22) Filed: Feb. 10, 2009

(65) Prior Publication Data

US 2010/0070623 A1 Mar. 18, 2010

(30) Foreign Application Priority Data

Sep. 17, 2008 (JP) ................................ 2008-237720

(51) Int. Cl.
*G06F 15/16* (2006.01)
*G06F 15/177* (2006.01)
*G06F 15/173* (2006.01)

(52) U.S. Cl.
USPC ............ 709/245; 709/220; 709/222; 709/224

(58) Field of Classification Search
USPC .................................. 709/245, 224, 220, 222
See application file for complete search history.

(56) References Cited

U.S. PATENT DOCUMENTS

| | | | |
|---|---|---|---|
| 7,096,273 B1 * | 8/2006 | Meier | 709/236 |
| 7,895,648 B1 * | 2/2011 | Nandy et al. | 726/14 |
| 2005/0198384 A1 | 9/2005 | Ansari et al. | |
| 2007/0086449 A1 * | 4/2007 | Huang et al. | 370/389 |
| 2011/0047261 A1 | 2/2011 | Gobara et al. | |

FOREIGN PATENT DOCUMENTS

| | | |
|---|---|---|
| CN | 1741523 A | 3/2006 |
| CN | 101043411 A | 9/2007 |
| EP | 1 931 088 A1 | 6/2008 |
| JP | A-2003-018184 | 1/2003 |
| JP | A-2003-060672 | 2/2003 |
| JP | A-2005-218111 | 8/2005 |
| JP | A-2007-066145 | 3/2007 |
| JP | A-2007-166146 | 6/2007 |
| JP | A-2008-098813 | 4/2008 |
| WO | WO 2008/044432 A1 | 4/2008 |

OTHER PUBLICATIONS

RFC 791—Internet protocol, Sep. 1981, all pages.*
Perkins, "IP Mobility Support for IPv4," Nokia Research Center, pp. 1-103, Aug. 2002, with Abstract <http://www.ietf.org/rfc/rfc3344.txt>.

(Continued)

*Primary Examiner* — Hieu Hoang
(74) *Attorney, Agent, or Firm* — Oliff & Berridge, PLC

(57) ABSTRACT

An information processing apparatus includes: a detecting unit that detects a change of a real IP address of the information processing apparatus; and a change notification transmitting unit that generates, when the detecting unit detects the change of the real IP address of the information processing apparatus during communication with a communication partner, a change notification packet, and transmits the generated change notification packet to the communication partner. The charge notification packet includes a header portion and a data portion. The real IP address before the change is included as a source IP address in the header portion of the charge notification packet, and a real IP address after the change is included in the data portion of the charge notification packet.

8 Claims, 13 Drawing Sheets

(56) References Cited

OTHER PUBLICATIONS

Arkko et al., "Using IPsec to Protect Mobile IPv6 Signaling Between Mobile Nodes and Home Agents," Nokia Research Center pp. 1-42, with Abstract, Jun. 2004, <http://www.ietf.org/rfc/rfc3776.text>.

Japanese Office Action in Japanese Patent Application No. 2008-237720 dated Jul. 20, 2010 (with English translation).
Office Action issued in Chinese Patent Application No. 200910129435.5 dated Apr. 27, 2013 (with translation).

* cited by examiner

US 8,615,604 B2

INFORMATION PROCESSING APPARATUS, INFORMATION PROCESSING SYSTEM AND COMPUTER READABLE MEDIUM FOR MAINTAINING COMMUNICATION WHILE IP ADDRESSES CHANGE

CROSS-REFERENCE TO RELATED APPLICATIONS

This application is based on and claims priority under 35 USC 119 from Japanese Patent Application No. 2008-237770 filed Sep. 17, 2008.

BACKGROUND

1. Technical Field

The present invention relates to an information Processing apparatus, an information processing system, and a Computer readable medium.

2. Related Art

In order to allow continuation of a communication session even when an IP (Internet Protocol) address is changed during communication, there is known a system comprising, e.g., a mechanism for notifying, when the IP address of a node is changed, the changed IP address to the node of a communication partner.

SUMMARY

According to an aspect of the invention, an information processing apparatus includes: a detecting unit that detects a change of a real IP address of the information processing apparatus; and a change notification transmitting unit that generates, when the detecting unit detects the change of the real IP address of the information processing apparatus during communication with a communication partner, a change notification packet, and transmits the generated change notification packet to the communication partner. The charge notification packet includes a header portion and a data portion. The real IP address before the change is included as a source IP address in the header portion of the charge notification packet, and a real IP address after the change is included in the data portion of the charge notification packet.

BRIEF DESCRIPTION OF THE DRAWINGS

Exemplary embodiment(s) of the present invention will be described in detail based on the following figures, wherein.

DETAILED DESCRIPTION

Figure 1:
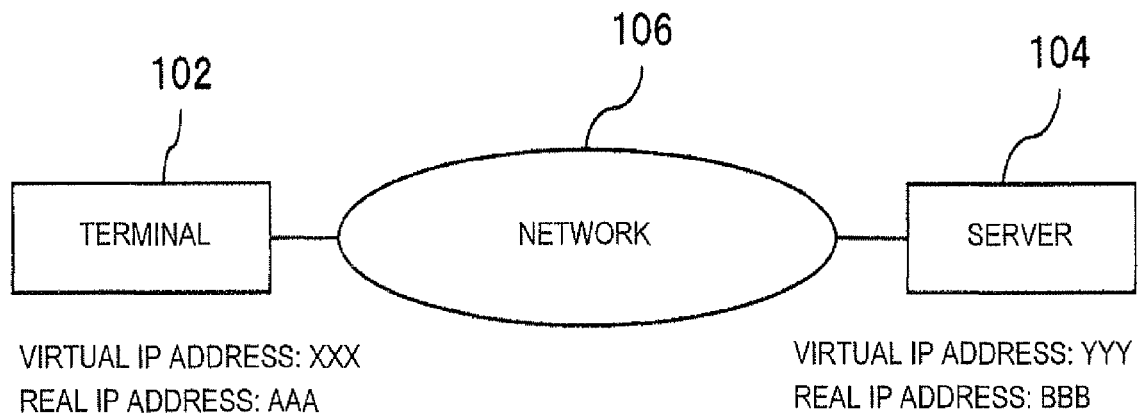
FIG. 1 is a view showing an example of a network to which a mechanism of an exemplary embodiment is applied.

An exemplary embodiment of the present invention will be described by taking a network structure as shown in FIG. 1 as an example. In the example of FIG. 1, a terminal 102 and a server 104 are connected with each other via a network 106. The network 106 is a data communication network based on an IP protocol such as the Internet or the like. The terminal 102 is a computer device such as a personal computer that is used by a user. The server 104 is a computer device for providing a service to the terminal 102.

Each of the terminal 102 and the server 104 has a real IP address for communication using the IP protocol. The server 104 has, e.g., a global IP address as the real IP address in order to provide a service to the terminal 102 via the Internet. On the other hand, when the terminal 102 is connected to a LAN (Local Area Network) in a company, a private IP address in the LAN, for example, is assigned to the terminal 102 as the real IP address. The terminal 102 may have the global IP address.

To each of the terminal 102 and the server 104, a unique virtual address is assigned. Applications in the terminal 102 and the server 104 perform communication by using the virtual IP addresses. That is, each application generates a packet having a destination and a source represented by the virtual IP address (referred to as an original packet), and an IP packet process unit (described later) in each of the terminal 102 and the server 104 encapsulates the original packet by adding a header in which the destination and the source are represented by the real IP address to the original packet and sends it to the external network 106.

The virtual IP address is managed uniquely at a node by a server such as, e.g., a VPN (Virtual Private Network) server which builds a virtual private network connection, and is assigned to the client 102 and the server 104. When the server 104 is the VPN server, the server 104 assigns the virtual IP address to the client 102.

The virtual IP address is not changed until a communication node (for example, the application in the terminal 102 or the server 104) to which the virtual IP address is assigned stops using the virtual IP address. For example, while the application in the terminal 102 and the application in the sever 104 continue a communication session, the virtual IP addresses used by the both applications are not changed. On the other hand, the real IP addresses held by the terminal 102 and the server 104 may be changed without the involvement of these applications. The change of the real IP address occurs when a manager performs the operation for changing the IP address, and when the terminal 102 as a mobile terminal moves to another LAN.

Figure 2:
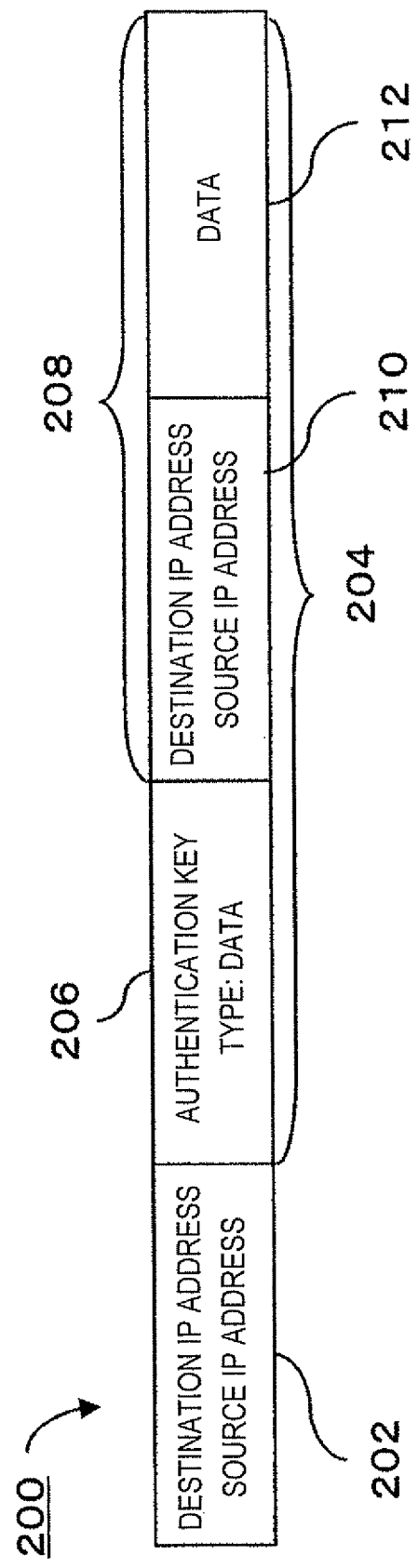
FIG. 2 is a view showing an example of a data structure of an encapsulated data packet exchanged between a terminal and a server in a system of the exemplary embodiment.

FIG. 2 shows an example of a data structure of a data packet 200 which is exchanged between the terminal 102 and the server 104. The packet is a set of communication data items and the structure thereof is constructed of a header portion and a data portion. The header portion is control information required for the establishment of the communication and is added to the head of the data portion. The data portion is information on the content to be communicated. In this example, the real IP address of the terminal 102 or the server 104 is set as a destination IP address and a source IP address in a header portion 202 of the data packet 200. On the other hand, a data portion 204 (also referred to as a "payload") of the data packet 200 includes additional information 206 and an original packet 208 generated by the application in the terminal 102 or the server 104. In other words, the data packet 200 is obtained by encapsulating the original packet 208.

The additional information 206 includes an authentication key (key) and type information. The authentication key is a secret key shared by the terminal 102 and the server 104. With this authentication key, the terminal 102 determines (authenticates) that the data packet 200 is from the server 104, and the server 104 determines that the data packet 200 is from the terminal 102. The authentication key is shared by using a key exchange protocol when, e.g., the communication between the terminal 102 and the server 104 is started. The type information is information for indicating the type (kind) of the packet exchanged between the terminal 102 and the server 104.

In this exemplary embodiment, examples of the packet type include the data packet and a change notification packet. The data packet is a packet for accommodating data exchanged by the applications of the terminal 102 and the server 104. A value of the type information indicating the data packet is, e.g., "DATA". The value of the type information of the data packet 200 of FIG. 2 is also "DATA". In contrast, the change notification packet (see FIG. 3) is a packet used when the change of the real IP address is notified to a communication partner. The value of the type information indicating the change notification packet includes, e.g., "ADDR".

The virtual IP address of the terminal 102 or the server 104 is set as the destination IP address and the source IP address in a header portion 210 of the original packet 208. Data used by the application is accommodated in a data portion 212 of the original packet 208.

Figure 3:
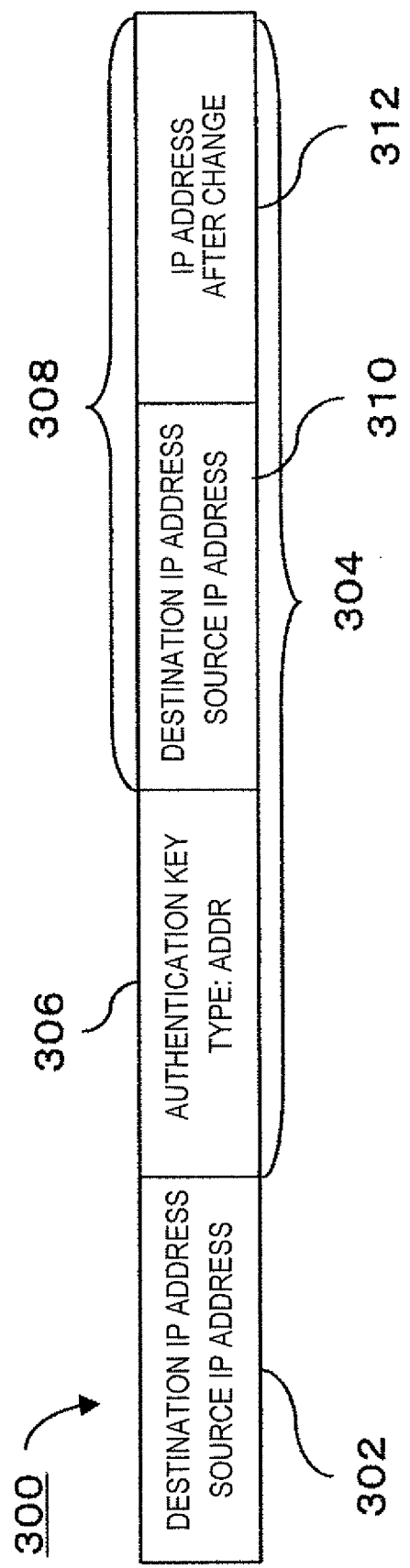
FIG. 3 is a view showing an example of the data structure of a change notification packet exchanged between the terminal and the server in the system of the exemplary embodiment.

FIG. 3 shows an example of the data structure of a change notification packet 300. The change notification packet is transmitted by the communication node of which the real IP address is changed in order to notify the change of the real IP address to the communication partner. As a variation, when the IP address of the router connecting the communication node with the network 106 is changed, there is a case where the communication node transmits the change notification packet (the detail will be described later). The real IP address of the terminal 102 or the server 104 is set as the destination IP address and the source IP address in a header portion 302 of the change notification packet 300.

It is to be noted that, since the change notification packet 300 is transmitted after the real IP address is changed, the source IP address of the header portion 302 is normally the real IP address after the change. However, in this exemplary embodiment, it is assumed that the source IP address of the header portion 302 of the change notification packet 300 transmitted by the server 104 is the real IP address before the change of the server 104. The source IP address of the header portion 302 of the change notification packet 300 transmitted by the terminal 102 is the real IP address after the change. Thus, in this exemplary embodiment, it is determined whether to use the real IP address before the change or the real IP address after the change as the source IP address of the header portion 302 depending on whether the type of the communication node is the terminal 102 or the server 104.

The type of the communication node mentioned herein is determined by whether, when the communication node of concern receives the packet from the network 106, the packet is protected by a device for inspecting (checking) the destination and source IP addresses of the coming packet such as the router having a NAT (Network Address Translation) function or a NAPT (Network Address Port Translation) function and the communication session with the communication node from the external network can be started or not. In addition, the device for inspecting the destination and source IP addresses of the coming packet includes various devices such as a firewall and the like. Such an inspecting device stores (caches) the destination and source IP addresses of the packet sent from an internal network (in contrast, the network 106 is the external network) protected by the inspecting device, and allows the packet returning from the destination to the source to enter the internal network and does not allow the packet other than the packet described above to enter. That is, in the example assumed herein, the terminal 102 is a node which receives the packet via such an inspecting device, while the server 104 is a node which receives the packet without the intervention of the inspecting device.

A data portion 304 of the change notification packet 300 includes additional information 306 and an original packet 308. The additional information 306 includes the authentication key and the type information. Since the change notification packet is used in this example, the value of the type information is "ADDR".

The virtual IP address of the terminal 102 or the server 104 is set as the destination IP address and the source IP address in a header portion 310 of the original packet 308. In the example of FIG. 3, the real IP address after the change to be notified is accommodated in a data portion 312 of the original packet 308.

The content of the data accommodated by the data portion 312 differs according to the type of the communication node that has generated the change notification packet 300. The types of the communication nodes are the same as those described above. When the type is the sever 104, the IP address after the change is accommodated in the data portion 312. When the type is the terminal 102, the data portion 312 is empty.

Figure 4:
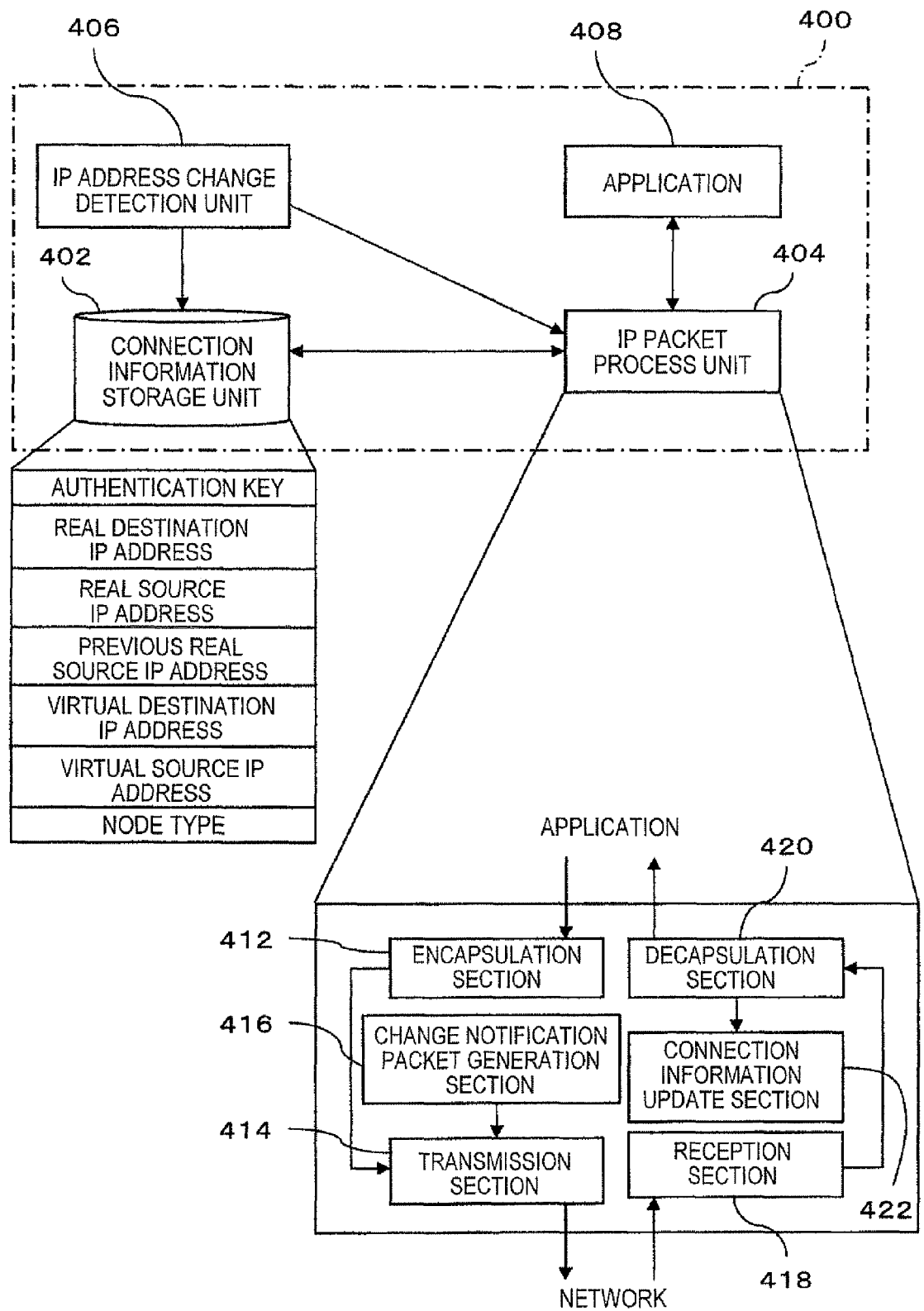
FIG. 4 is a view showing an example of a functional structure of a communication node (terminal or server)

Next, an example of a functional structure inside each of the communication nodes (the terminal 102 and the server 104) will be described by using FIG. 4. As shown in FIG. 4, a communication node 400 has a connection information storage unit 402, an IP packet process unit 404, an IP address change detection unit 406, and an application 408. The application 408 of the server 104 executes a process for providing a service to the application 408 of the terminal 102. For example, when the server 104 is a Web server, the application 408 of the server 104 provides a Web server function. In this case, the application 408 of the terminal 102 is, e.g., a Web browser. The application 408 stores the virtual IP addresses assigned to itself and the application of the communication partner, and generates the original packet 208 by using the virtual IP addresses when data is transmitted to the communication partner. The application 408 may be arranged to refer to information on the virtual IP addresses stored in the connection information storage unit 402 which will be described later without storing the virtual IP addresses of itself and the communication partner.

The connection information storage unit 402 stores various information items used for a communication connection with the communication node of the communication partner. In the example shown in the drawing, the connection information storage unit 402 stores information on the authentication key, a real destination IP address, a real source IP address, a previous real source IP address, a virtual destination IP address, a virtual source IP address, and a node type. Among them, the previous real source IP address is the real source IP address before a change when the real source IP address is changed. The node type is the type of the communication node of concern. That is, the value of the node type indicates whether the communication node of concern corresponds to the type of the server or the terminal described above. The value of the node type is, e.g., "SERVER" for the server, while the value of the node type is, e.g., "CLIENT" for the terminal. Among information items stored in the connection information storage unit 402, the information items other than the previous real source IP address and the node type have already been described.

Among these items, the value of each of the items except the previous real source IP address is set by a known method before the communication between the applications of the communication nodes (the terminal 102 and the server 104) is started.

When the communication node of concern performs the communication with a plurality of communication partners, the information on the authentication key, the real destination IS address, and the virtual destination IP address is stored individually for each of the communication partners.

The IP address change detection unit 406 detects the change of the real IP address of the communication node of concern. The IP address change detection unit 406, for example, makes an inquiry periodically to a system storing and managing the real IP address of the communication node of concern such as an operating system of the communication node or the like to determine the value of the real IP address at the time of the inquiry. From the comparison between the value and the value at the time of the previous inquiry, the change of the real IP address is detected. In other words, for example, when the real IP address determined at this time is different from the real IP address determined at the previous time, it is determined that the real IP address is changed. When the change of the real IP address is detected, the IP address change detection unit 406 copies the value of the item "real source IP address" stored in the connection information storage unit 402 to the item "previous real source IP address", and overwrites the item "real source IP address" with the real IP address after the change.

The IP packet process unit 404 is positioned between the application 408 and the network, and executes the process in association with the IP packet for the communication between the application 408 and the communication partner on the network. For example, the IP packet process unit 404 encapsulates the original packet generated by the application 408 and sends the encapsulated original packet to the network, and decapsulates the packet sent from the communication partner to take out the original packet and provides the original packet to the application 408. In addition, the IP packet process unit 404 performs the process for generating the change notification packet and sending the change notification packet to the communication partner when the change of the real IP address of the node thereof is detected. Further, the IP packet process unit 404 also performs, when the IP packet process unit 404 receives the change notification packet from the communication partner, the process for updating the information on the destination stored in the connection information storage unit 402 based on the information included in the change notification packet.

The IP packet process unit 404 includes an encapsulation section 412, a transmission section 414, a change notification packet generation section 416, a reception section 418, a decapsulation section 420, and a connection information update section 422. The encapsulation section 412 encapsulates the original packet 208 received from the application 408 to generate a packet which can be sent to the external network (the network 106). In other words, the encapsulation section 412 adds the header portion 202 and the additional information 206 to the original packet 208 using the information stored in the connection information storage unit 402 to generate a packet that is encapsulated (referred to as an encapsulated packet). That is, the real destination IP address and the real source IP address in the connection information storage unit 402 are set as the destination IP address and the source IP address in the header portion 202, the authentication key and the packet type "DATA" are further set in the additional information 206, and the header portion 202 and the additional information 206 are added to the original packet 208, whereby the encapsulated packet is generated. The encapsulated packet generated by the encapsulation section 412 is sent to the network via the transmission section 414.

The change notification packet generation section 416 generates the change notification packet 300 (see FIG. 3) on reception of a notice of the detection of the change of the real IP address of the communication node of concern from the IP address change detection unit 406. At this time, the change notification packet generation section 416 generates the change notification packet 300 in accordance with the value of the item "node type". In other words, when the node type is "SERVER", the change notification packet generation section 416 generates the change notification packet 300 in which the value of the item "previous real source IP address" (i.e., before the change) is set as the real source IP address of the header portion 302, and the value of the item "real source IP address" (i.e., after the change) is included in the data portion 312. When the node type is "CLIENT", the change notification packet generation section 416 generates the change notification packet 300 in which the value of the item "real source IP address" is set as the real source IP address of the header portion 302, and the data portion 312 is empty. In this case, the type of the change notification packet 300 is "ADDR", and the destination IP address and the source IP address of the header portion 310 of the original packet 308 are the virtual destination IP address and the virtual source IP address read from the connection information storage unit 402. The generated change notification packet 300 is sent to the network by the transmission section 414.

The IP packet process unit 404 may be arranged to monitor a timeout of the communication session with the communication partner, and cause the change notification packet generation section 416 to generate the change notification packet 300 when the timeout occurs. This arrangement is performed, e.g., to cope with the case where the real IP address (the global IP address for the network 106) of a NAT router connecting the internal network to which the communication node of concern is connected and the external network (the network 106) is changed (the detail will be described later).

For example, when a response to the transmitted packet from the communication partner is not returned within a predetermined time period (referred to as a timeout value), it may be determined that the timeout of the communication session has occurred. It is assumed that the timeout value used herein is a value sufficiently lower than the timeout value managed by the application 408. That is, the application 408 generates the original packet 208 and performs the communication with the application of another communication node, and the timeout value of the communication is set for the application 408. By setting the timeout value of the IP packet process unit 404 to be sufficiently lower than the timeout value of the application 408, even when the real IP address of the NAT router is changed, the change is notified to the communication partner before the communication between the application 408 and the application of the communication partner is terminated. As the result, the communication is continued.

The reception section 418 receives a packet coming from the network and addressed to the communication node of concern. The received packet is passed to the decapsulation section 420.

The decapsulation section 420 decapsulates the encapsulation of the packet (the encapsulated packet). In other words, the decapsulation section 420 takes out the original packet 208 or 308 obtained by removing the header portion 202 or 302 and the additional information 206 or 306 from the received encapsulated packet.

The decapsulation section 420 examines whether or not the destination IP address and the source IP address set in the header portion 210 or 310 of the original packet 208 or 308, and the authentication key of the additional information 206 or 306 match the virtual source IP address, the virtual destination IP address, and the authentication key stored in the connection information storage unit 402. When even any one of the three values does not match, the decapsulation section 420 discards the original packet.

When all of the three values match the values registered in the connection information storage unit 402, the decapsulation section 420 further examines the type information of the additional information 206 or 306. Then, when the type information indicates "DATA", the decapsulation section 420 takes out the original packet 208 from the data packet of concern 200, and passes it to the application 408. The application 408 takes out the data portion 212 from the received original packet 208, and performs the process of the application 408 of concern by using the data content of the data portion 212.

On the other hand, when the type information indicates "ADDR", the packet of concern is the change notification packet 300, and the decapsulation section 420 passes the change notification packet 300 to the connection information update section 422.

The connection information update section 422 updates the value of the item "real destination IP address" stored in the connection information storage unit 402 by using the received change notification packet 300. In other words, when the data portion 312 of the original packet 308 in the change notification packet 300 is empty, the connection information update section 422 overwrites the item "real destination IP address" in the connection information storage unit 402 with the real source IP address of the header portion 308 of the change notification packet 300 of concern. When the IP address is accommodated in the data portion 312 of the original packet 308 in the change notification packet 300, the connection information update section 422 overwrites the item "real destination address" in the connection information storage unit 402 with the IP address.

Next, with reference to FIGS. 5 to 12, an example showing how a system of the present exemplary embodiment operates in a specific situation will be described. First, a first case will be described with reference to FIGS. 5 and 6.

Figure 5:
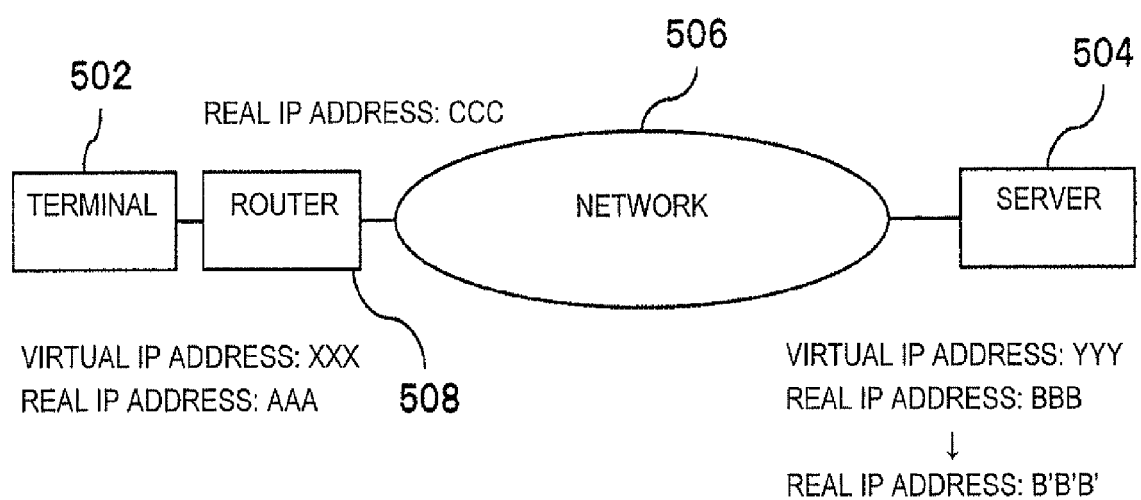
FIG. 5 is a view for illustrating a first case.

In the first case, as shown in FIG. 5, a terminal 502 performs communication with a server 504 via a network 506 such as the Internet or the like. To the terminal 502, the private real IP address AAA and the virtual IP address XXX are assigned. To the server 504, the real IP address BBB and the virtual IP address YYY are assigned. In this first case, a case is assumed in which the real IP address of the server 504 is changed from BBB to B'B'B' during the communication with the terminal 502.

The wording "during the communication" mentioned herein unit the state until the communication session started between the terminal 502 and the server 504 is terminated by an explicit instruction for termination, the timeout, or the like. In this example, the packet starting the communication session from the external network 506 is blocked by a router 508.

The terminal 502 is connected to the internal network, and the router 508 having a NAT (NAPT) function is provided at an interface between the internal network and the external network. The router 508 is assigned the real IP address CCC at the interface on the side with the Internet 506. The router 508 performs a NAPT process with respect to the packet from the terminal 502, and transmits the processed packet to the Internet 506. In other words, the source IS address of the packet transmitted from the router 508 is translated into the real IP address CCC, and a source port thereof is translated into pC (or pC' (in the case after the change of the real IP address)).

Ports used by the IP packet process units 404 of the terminal 502 and the server 504 are fixed irrespective of the change of the IP address, and are assumed to be pA and pB. The ports used by the applications 408 of the terminal 502 and the server 504 are also assumed to be fixed irrespective of the change of the real IP address of the terminal 502 or the server 504.

Figure 6:
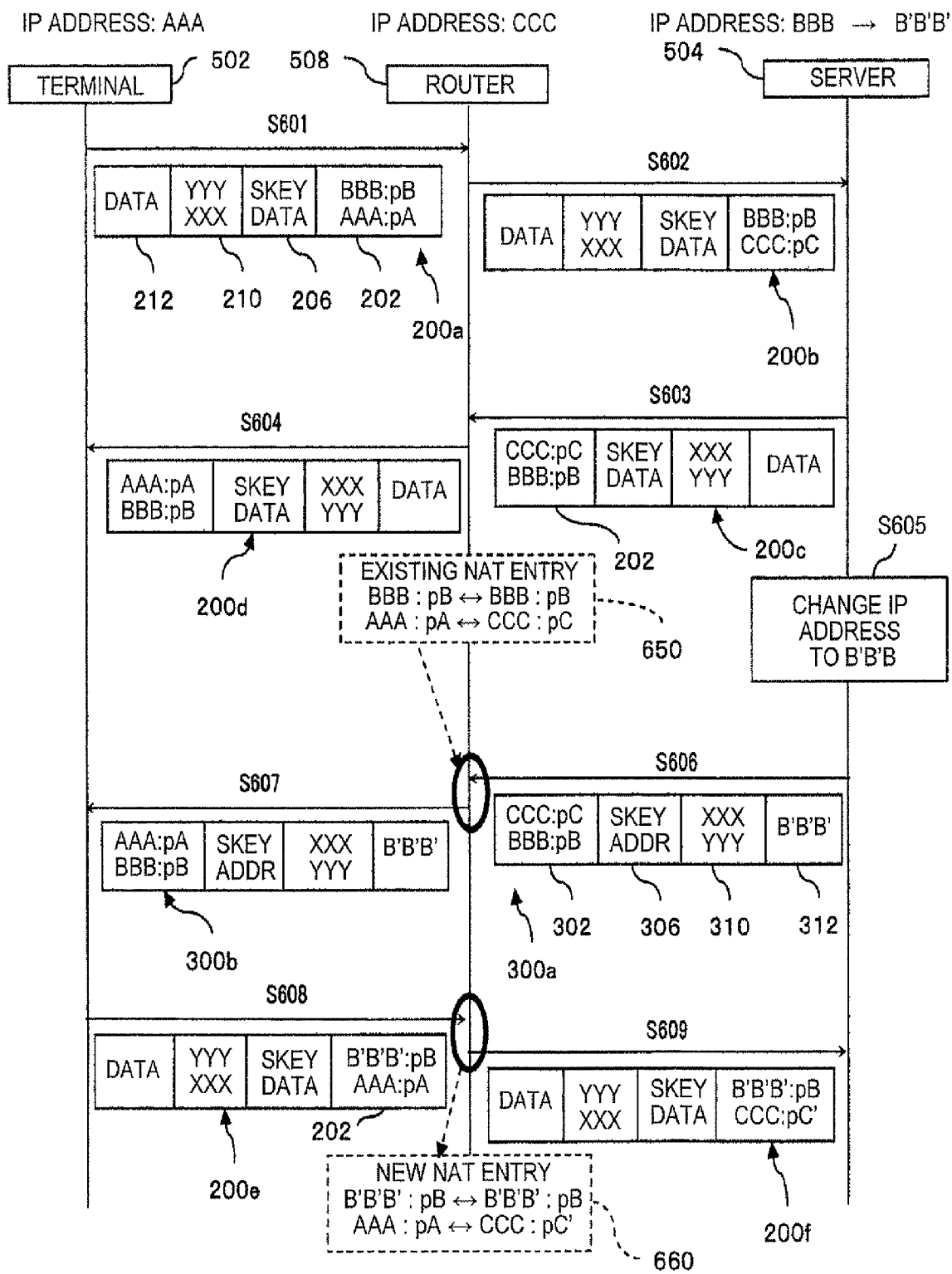
FIG. 6 is a view for illustrating the flow of the exchange of a packet in the first case.

FIG. 6 shows the flow of a process in the first case. Before the first step S601 in this flow is executed, following values are set in the connection information storage unit 402 of the terminal 502:
Authentication key: SKEY
Real destination IP address: BBB
Real source IP address: AAA
Previous real source IP address: not set
Virtual destination IP address: YYY
Virtual source IP address: XXX
Node type: CLIENT Following values are set in the connection information storage unit 402 of the server 504:
Authentication key: SKEY
Real destination IP address: not set
Real source IP address: BBB
Previous real source IP address: not set
Virtual destination IP address: XXX
Virtual source IP address: YYY
Node type: SERVER S601 to S604 show transmission/reception of the data packet 208 by the terminal 502 and the server 504 via the router 508. The data packet 200 that is transmitted/received herein has the data structure shown in FIG. 2. Each of the IP packet process units 404 of the terminal 502 and the server 504 sends the original packet 208 to the application 408 when it is determined that the virtual destination and source IP addresses and the authentication key of the coming data packet 200 match the corresponding values stored in the connection information storage unit 402.

In other words, a data packet 200*a* transmitted from the terminal 502 in S601 is received by the router 508 having the NAPT function. The router 508 translates the source IP address and the port number "AAA: pA" of the header portion 202 in the data packet 200*a* into the outgoing source IP address and the port number "CCC: pC" of the router 508 in S602, and sends a packet 200*b* after the translation to the external network 506. At this time, the router 508 generates and stores (caches) a NAT (NAPT) entry 650 which translates the destination into "BBB: pB" (incoming) or "BBB: pB" (outgoing) (the values are not changed by this translation) and the source into "AAA: pA" (incoming) or "CCC: pC" (outgoing). When the NAT entry having the same content already exists, the generation thereof is not necessary.

In the server 504 having received the data packet 200*b*, the application therein processes the data 212 in the data packet, and a response packet 200*c* including the result of the process is sent to the network 506 in S603.

Since the combination of the destination and source IP addresses of the header portion 202 matches the combination of the outgoing source and destination IP addresses of the existing NAT entry 650, the router 508 having received the response packet 200*c* allows the response packet 200*c* to enter the internal network. At this time, the router 508 changes the destination IP address of the header portion 202 of the response packet 200*c* to "AAA: pA" in accordance with the NAT entry 650, and sends a packet 200*d* after the change to the internal network in S604. The packet 200*d* is received by the terminal 502.

It is assumed that, after S604, the real IP address of the server 504 has been changed from BBB to B'B'B' (S605). In this case, the IP address change detection unit 406 of the server 504 detects the change of the IP address, and updates the values of the real source IP address and the previous real source IP address in the connection information storage unit 402 of the server 504. With this update, the information in the connection information storage unit 402 of the server 504 becomes as follows:
  Authentication key: SKEY
  Real destination IP address: CCC
  Real source IP address: B'B'B'
  Previous real source IP address: BBB
  Virtual destination IP address: XXX
  Virtual source IP address: YYY
  Node type: SERVER The IP packet process unit 404 of the server 504 generates a change notification packet 300*a* and transmits it to the router 508 via the network 506 (S606). The real IP address before the change BBB is set as the source IP address of the header portion 302 of the change notification packet 300*a*, and the real IP address after the change B'B'B' is accommodated in the data portion 312.

The change notification packet 300*a* is received by the router 508. Since the combination of the destination and source IP addresses of the header portion 302 matches the combination of the outgoing source and destination IP addresses of the existing NAT entry 650, the router 508 allows the response packet 300*a* to enter the internal network. At this time, the router 508 changes the destination IP address of the header portion 302 of the change notification packet 300*a* to "AAA: pA" in accordance with the NAT entry 650, and sends a packet after the change 300*b* to the internal network at S607.

It is assumed herein that the server 504 has set a valid real IP address (i.e., the real IP address after the change) as the source IP address of the header portion 302 when the server 504 generates the change notification packet. In this case, since the NAT entry including the real IP address after the change does not exist, the router 508 does not allow the change notification packet to enter the internal network. As a result, the change of the real IP address of the server 504 is not communicated to the terminal 502.

In contrast, in this exemplary embodiment, since the real IP address before the change is set as the source IP address of the header portion 302, the change notification packet 300*a* matches the existing NAT entry 650 in the router 508, and is communicated to the terminal 502 via the internal network.

The IP packet process unit 404 of the terminal 502 having received the change notification packet 300*b* determines that the virtual destination and source IP addresses and the authentication key of the packet 300*b* match the corresponding values stored in the connection information storage unit 402. When the match is determined, the value of the item "real destination IP address" in the connection information storage unit 402 of the terminal 502 is updated with the value of the IP address after the change included in the data portion 312 of the packet 300*b*. With this update, the information in the terminal 502 becomes as follows:
  Authentication key: SKEY
  Real destination IP address: B'B'B'
  Real source IP address: AAA
  Previous real source IP address: not set
  Virtual destination IP address: YYY
  Virtual source IP address: XXX
  Node type: CLIENT After this update, when the application 408 of the terminal 502 transmits data to the application 408 of the server 504, the IP packet process unit 404 of the terminal 502 performs encapsulation by using the updated information in the connection information storage unit 402. Thus, the IP packet process unit 404 sends a data packet 200*e* having the real IP address after the change B'B'B' of the server 504 as the destination IP address of the header portion 202 (S608). The data packet 200*e* becomes a data packet 200*f* by an address translation in the router 50S, and transmitted to the server 504 via the network 506 (S609). At the time of this address translation, the router 508 generates and stores (caches) a new NAT entry 660 which translates the destination into "B'B'B': pB" (incoming) or "B'B'B': pB" (outgoing) (the values are not changed by this translation) and the source into "AAA: pA" (incoming) or "CCC: pC'" (outgoing). Although the router 508 is assigned a new port number pC' for the communication using the IP address after the change of the server 504, the assignment is not essential.

When the server 504 having received the data packet 200*f* generates a data packet responding thereto, though the depiction thereof is omitted, the value of the real source IP address B'B'B' in the connection information storage unit 402 is set as the source IP address of the header portion 202. Since the destination and source addresses of the header portion 202 of the response packet match the NAT entry 660, the response packet reaches the terminal 502 through the router 508.

Thus, even when the real IP address of the server 504 is changed during the continuation of the communication session, it follows that the communication session is continued.

Figure 7:
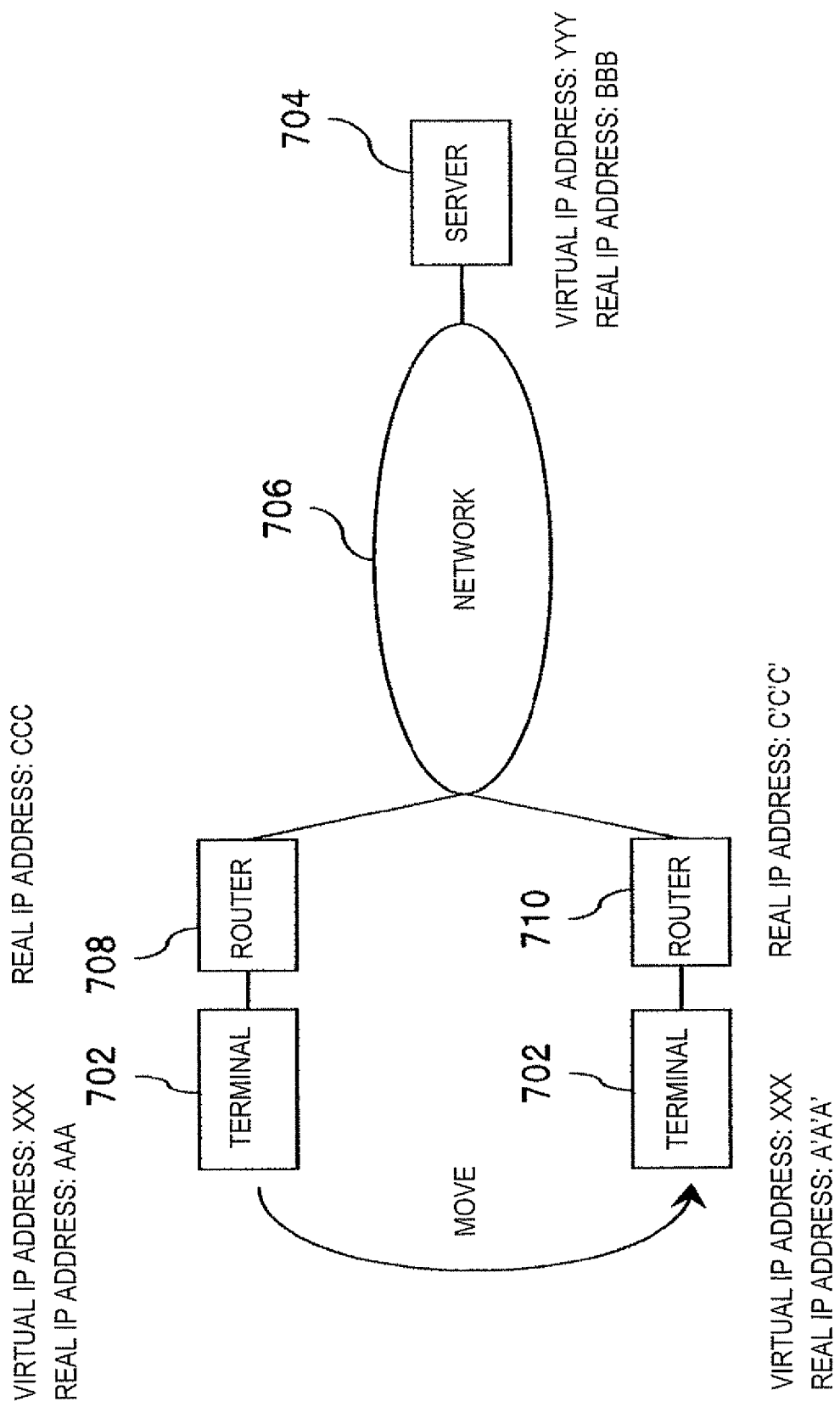
FIG. 7 is a view for illustrating a second case.

Next, a second case will be described with reference to FIGS. 7 and 8. In the second case, as shown in FIG. 7, a terminal 702 performs communication with a server 704 via a network 706 such as the Internet or the like. To the terminal 702, the private real IP address AAA and the virtual IP address XXX are assigned. To the server 704, the real IP address BBB and the virtual IP address YYY are assigned.

The terminal 702 is initially connected to an internal network, and a router 708 having the NAT function is provided at an interface between the internal network and the external network 706. To the router 708, the real IP address CCC is assigned at the interface on the side with the network 706. The router 708 performs the NAPT process with respect to the packet from the terminal 702, and transmits the processed packet to the network 706.

In this second case, a case is assumed in which the terminal 702 is, e.g., a mobile terminal and has moved to the internal network under another router 710 having the NAT (NAPT) function.

With this move, to the terminal 702, the private real IP address A'A'A' is assigned (from, e.g., a DHCP (Dynamic Host Configuration Protocol) server in the latter internal network). However, the virtual IP address of the terminal 702 is not changed with the move and remains to be XXX.

The router 710 is assigned the real IP address C'C'C' at the interface on the side with the network 706, performs the NAPT process with respect to the packet from the terminal 702, and transmits the packet resulting from the process to the network 706.

It is assumed that the ports used by the IP packet process units 404 of the terminal 702 and the sever 704 are fixed irrespective of the change of the IP address, and are pA and pB. It is also assumed that the ports used by the applications 408 of the terminal 702 and the server 704 are fixed irrespective of the change of the real IP address of the terminal 702 or the server 704.

Figure 8:
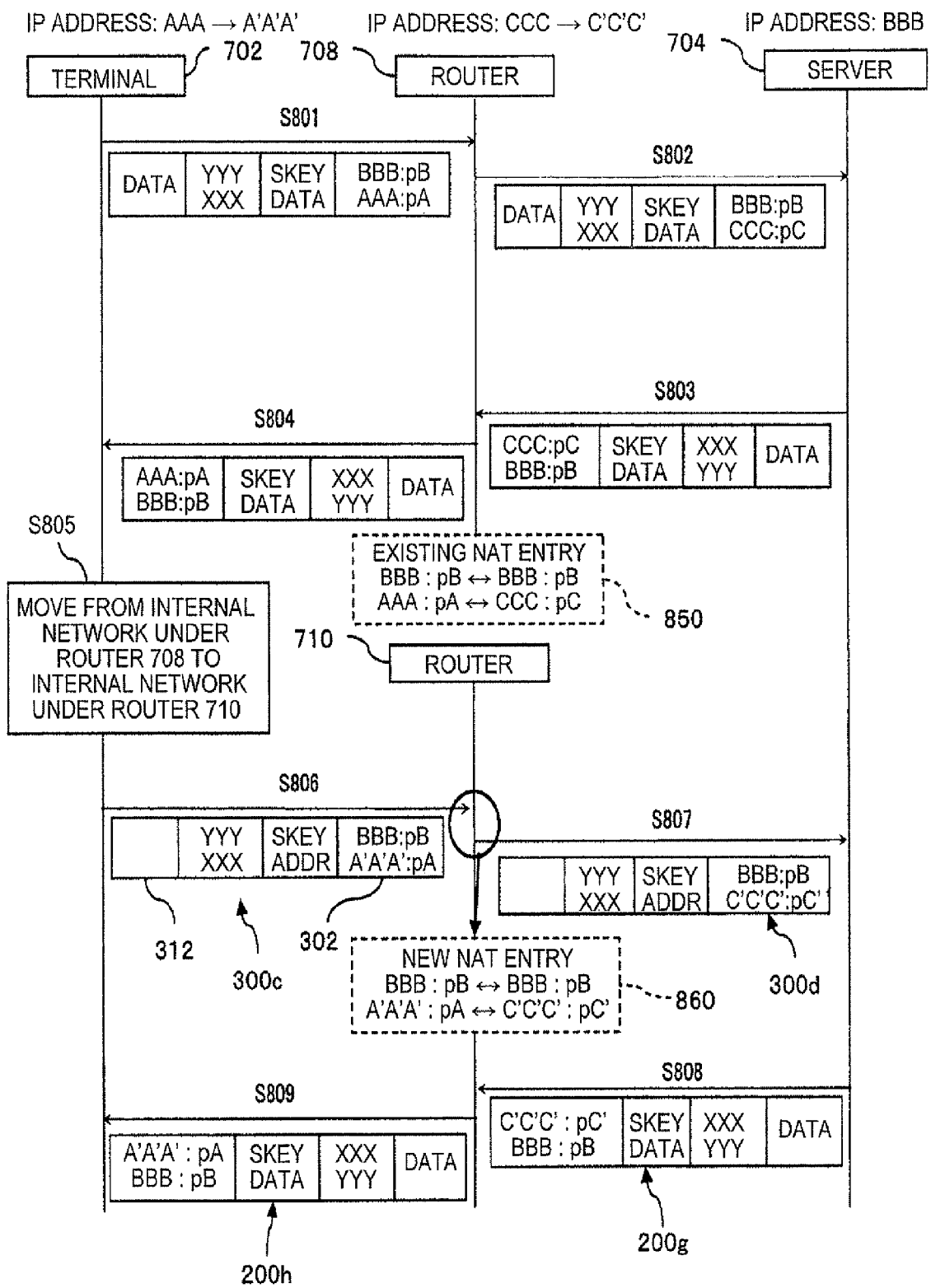
FIG. 8 is a view for illustrating the flow of the exchange of the packet in the second case.

FIG. 8 shows the flow of a process in the second case. The combination of the values stored in the connection information storage unit 402 of the terminal 702 before the first step S801 in this flow is executed is the same as the combination of the values stored in the terminal 502 and the server 504 before the step S601 is executed in the first case.

The steps from S801 to S804 in FIG. 8 illustrate the flow in which the data packet is sent from the terminal 702 to the sever 704, and the response packet responding thereto is returned from the server 704 to the terminal 702 when the terminal 702 exists in a first internal network under the router 708. This flow is the same as that of S601 to S604 in FIG. 6. In this flow, the router 708 performs the address translation by using a NAT entry 850.

It is assumed that, after S804, the terminal 702 has moved from the internal network under the router 708 to the internal network under the router 710, and the real IP address of the terminal 702 has been changed to A'A'A' with this move (S805) In this case, the IP address change detection unit 406 of the terminal 702 detects the change of the IP address and updates the values of the real source IP address and the previous real source IP address of the connection information storage unit 402 of the terminal 702. With this update, the information in the connection information storage unit 402 of the server 702 becomes as follows:

Authentication key: SKEY
Real destination IP address: BBB
Real source IP address: A'A'A'
Previous real source IP address: AAA
Virtual destination IP address: YYY
Virtual source IP address: XXX
Node type: CLIENT In response to this change, the IP packet process unit 404 of the terminal 702 generates a change notification packet 300c (S806). Since the node type in the connection information storage unit 402 is CLIENT, the IP packet process unit 404 sets the real IP address after the change A'A'A' as the source IP address of the header portion 302 of the change notification packet 300c, and leaves the data portion 312 empty.

The change notification packet 300c is subjected to the NAPT process by the router 710 and a change notification packet 300d resulting from the process is sent to the server 704 (S807). At this time, the router 710 generates a NAT entry 860 from the destination and source IP addresses of the header portion 302 of the change notification packet 300c and the outgoing real IP address of the router 710 and stores it.

The IP packet process unit 404 of the server 704 having received the change notification packet 300d determines that the virtual destination and source IP addresses and the authentication key of the packet 300d match the corresponding values in the connection information storage unit 402 of the server 704. Then, when the match is determined, the values in the connection information storage unit 402 are updated with the source IP address of the header portion 302 of the packet 300d so as to be the values shown below:

Authentication key: SKEY
Real destination IP address: C'C'C'
Real source IP address: BBB
Previous real source IP address: not set
Virtual destination IP address: YYY
Virtual source IP address: XXX
Node type: SERVER After this update, when the application 408 of the server 704 transmits data to the application 408 of the terminal 702, the IP packet process unit 404 of the server 704 performs encapsulation by using the updated information in the connection information storage unit 402. Thus, the IP packet process unit 404 sends a data packet 200g having the real IP address C'C'C' of the router 710 as the destination IP address of the header portion 202 (S808). The data packet 200g is received by the router 710. Since the combination of the destination and source IP addresses of the header portion 202 of the packet 200g matches the combination of the outgoing source and destination IP addresses of the NAT entry 860, the router 710 allows the packet 200g to enter the internal network. The router 710 changes the destination IP address of the packet 200g to "A'A'A': pA" in accordance with the NAT entry 860 and transmits a packet 200h resulting from the change to the terminal 702 via the internal network (S809).

Thus, in this exemplary embodiment, even when the terminal 702 moves from the internal network under the router 708 to the internal network under the router 710 and the real IP address of the terminal 702 is changed during the continuation of the communication session, the communication session is continued.

As a technology which allows the continuation of the communication even when the terminal moves from one network to another, Mobile IP v 4 (RFC 3344) and Mobile IP v 6 (RFC 3775) are known. Each of these technologies require that an intermediary server which is called a home agent and functions as, so to say, an apartment sitting is provided on the network. In contrast, the method of this exemplary embodiment does not require such an intermediary server.

Figure 9:
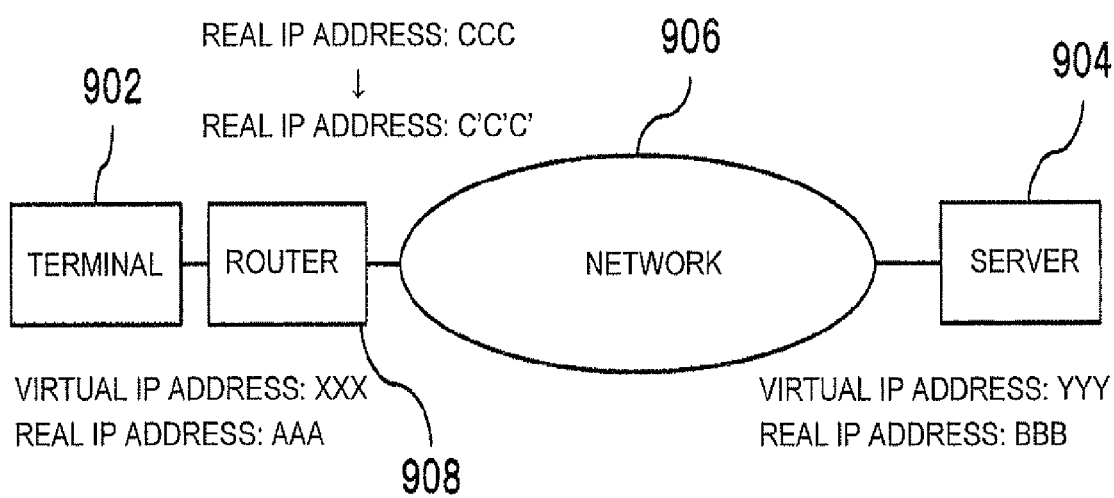
FIG. 9 is a view for illustrating a third case.

Next, a third case will be described with reference to FIGS. 9 and 10. In this third case, as shown in FIG. 9, a terminal 902 performs communication with a server 904 via a network 906 such as the Internet or the like. To the terminal 902, the private real IP address AAA and the virtual IP address XXX are assigned. To the server 904, the real IP address BBB and the virtual IP address YYY are assigned.

The terminal 902 is connected to an internal network and a router 908 having the NAT function is provided at an interface between the internal network and the external network 906. To the router 908, the real IP address CCC is assigned at the interface on the side with the network 906. The router 908 performs the NAPT process with respect to the packet from the terminal 902 and transmits the processed packet to the Internet 906. The source IP address of the packet transmitted from the router 908 is translated into the real IP address CCC of the router 908, and the source port number thereof is translated into pC.

In this third case, a case is assumed in which the real IP address of the router 908 is changed from CCC to C'C'C' during the communication between the terminal 902 and the server 904.

It is assumed that the ports used by the IP packet process units 404 of the terminal 902 and the server 904 are fixed irrespective of the change of the IP address, and are pA and pB. It is also assumed that the ports used by the applications 408 of the terminal 902 and the server 904 are fixed irrespective of the change of the real IP address of the terminal 902 or the server 904.

Figure 10:
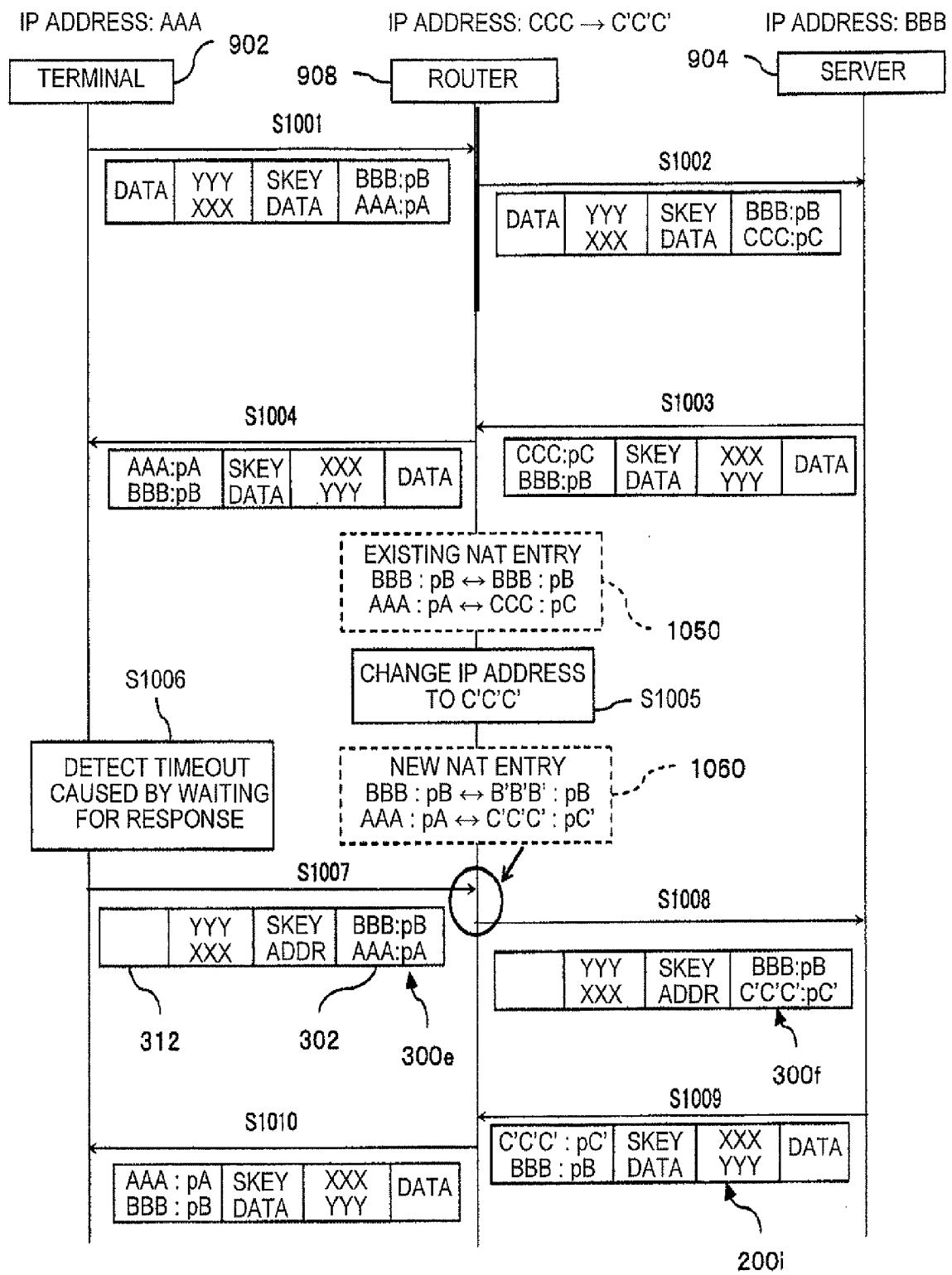
FIG. 10 is a view for illustrating the flow of the exchange of the packet in the third case.

FIG. 10 shows the flow of a process in the third case. The combination of the values stored in the connection information storage units 402 of the terminal 902 and the server 904 before the first step S1001 in this flow is executed is the same as the combination of the values stored in the terminal 502 and the server 504 before the step S601 is executed in the first case.

The steps from S1001 to S1004 in FIG. 10 illustrate the flow in which the data packet is sent from the terminal 902 to the server 904, and the response packet responding thereto is returned from the server 904 to the terminal 902. This flow is the same as that from S601 to S604 in FIG. 6. In this flow, the router 908 performs the address translation by using a NAT entry 1050.

It is assumed that, after S1004, the real IP address of the router 908 is changed from CCC to C'C'C' (S1005).

It is assumed that the data packet has been sent from the terminal 902 to the server 904 before this change, and then the real IP address of the router 908 has been changed as described above before the response packet responding to the data packet from the server 904 is sent. In this case, before the timeout caused by waiting for the response to the data packet occurs in the application 408 in the terminal 902, the timeout caused by waiting for the response occurs in the IP packet process unit 404 of the terminal 902 (S1006). In response to the timeout, the IP packet process unit 404 generates and transmits a change notification packet 300e (S1007). At this point, since the real IP address of the terminal 902 is not changed yet, the change notification packet 300e to be generated is a packet which has the real IP address of the terminal of concern 902 as the source IP address of the header portion 302 and has the empty data portion 312.

The router 908 having received the change notification packet 300e generates a NAT entry 1060 which translates the source IP address of the packet into the IP address after the change of itself, and performs the address translation in accordance with the NAT entry 1060. A change notification packet 300f after the address conversion is sent to the server 904 via the network 906 (S1008).

The IP packet process unit 404 of the server 904 having received the change notification packet 300f determines that the virtual destination and source IP addresses and the authentication key of the packet 300f match the corresponding values in the connection information storage unit 402 of the server 904. When the match is determined, the values in the connection information storage unit 402 are updated with the source IP address of the header portion 302 of the packet 300f so as to be the values shown below:

Authentication key: SKEY
Real destination IP address: C'C'C'
Real source IP address: BBB
Previous real source IP address: not set
Virtual destination IP address: YYY
Virtual source IP address: XXX
Node type: SERVER After this update, the server 904 generates a data packet 200i by using the values in the connection information storage unit 402 and transmits it to the terminal 902 via the router 908 (S1009, S1010).

Thus, in this exemplary embodiment, even when the IP address of the router 908 is changed during the continuation of the communication session, the communication session is continued.

Figure 11:
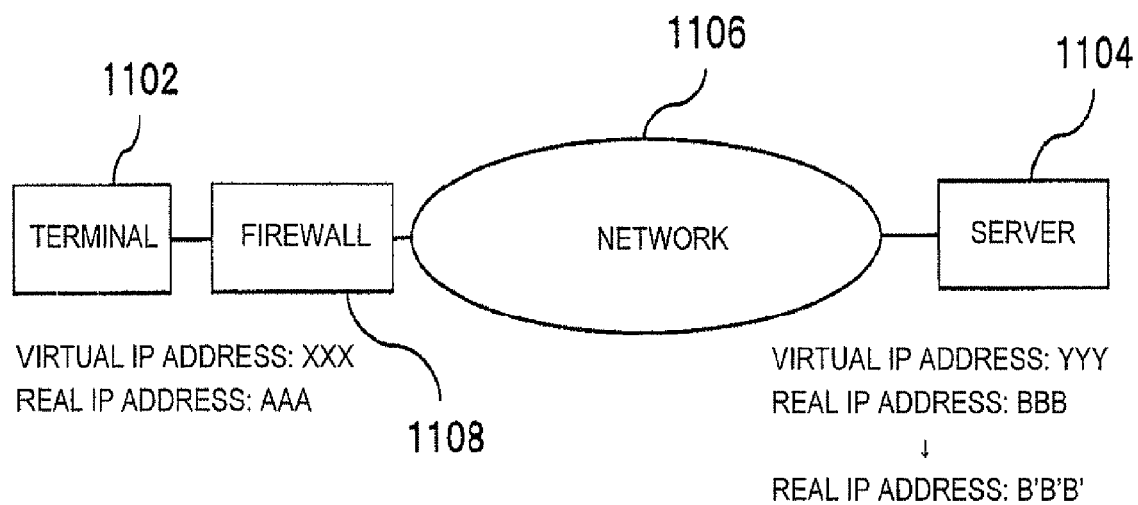
FIG. 11 is a view for illustrating a fourth case.

Next, a fourth case will be described with reference to FIGS. 11 and 12. In this fourth case, as shown in FIG. 11, a terminal 1102 performs communication with a server 1104 via a network 1106 such as the Internet or the like. To the terminal 1102, the private real IP address AAA and the virtual IP address XXX are assigned. To the server 1104, the real IP address BBB and the virtual IP address YYY are assigned.

The terminal 1102 is connected to an internal network and a firewall 1108 is provided at an interface between the internal network and the external network 1106. It is assumed that the firewall 1108 is set such that all of the packets which start the session from the side with the external network 1106 are blocked.

In this fourth case, it is assumed that the real IP address of the server 1104 is changed from BBB to B'B'B' while the terminal 1102 performs the communication session with the server 1104.

Figure 12:
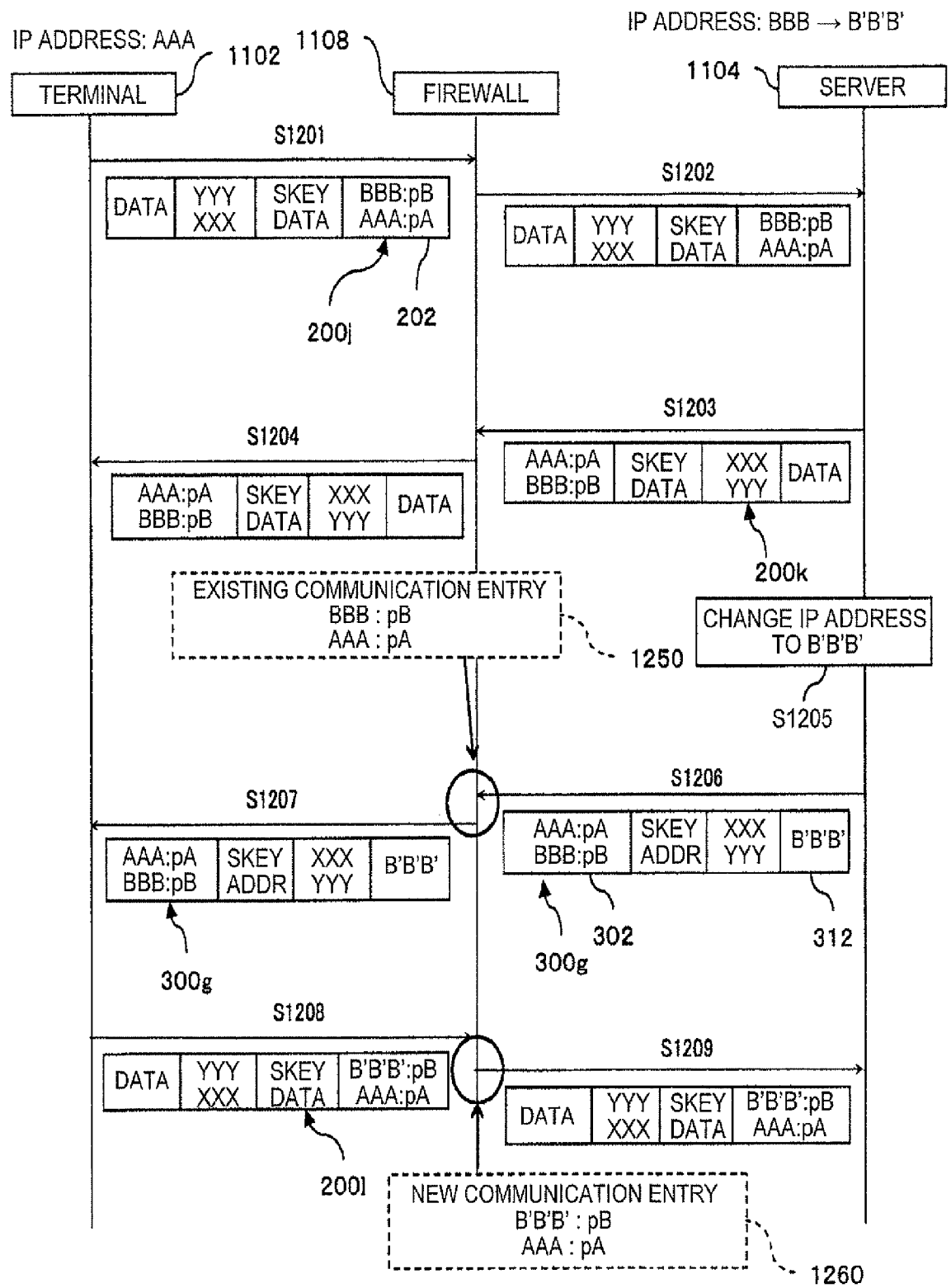
FIG. 12 is a view for illustrating the flow of the exchange of the packet in the fourth case.

FIG. 12 shows the flow of a process in the fourth case. The combination of the values stored in the connection information storage units 402 of the terminal 1102 and the server 1104 before the first step S1201 in this flow is executed is the same as the combination of the values stored in the terminal 502 and the server 504 before the step S601 is executed in the first case.

The steps from S1001 to S1004 in FIG. 12 illustrate the flow in which the data packet is sent from the terminal 1102 to the server 1104, and the response packet responding thereto is returned from the server 1104 to the terminal 1102. This flow is the same as that from S601 to S604 in FIG. 6 except that the firewall 1108 does not perform the NAPT process.

In this flow, the firewall 1108 generates and caches a communication entry 1250 for controlling the firewall when, e.g., the firewall 1108 receives a data packet 200j addressed to the server 1104 from the terminal 1102 in S1201. The communication entry 1250 is generated based on the header portion 202 of the packet 200j, and has the destination "BBB: pB" and the source "AAA: pA". Since the destination IP address "AAA: pA" and the source IP address "BBB: pB" of a response packet 200k from the server 1104 (S1203) match the communication entry 1250 held by the firewall 1108, the response packet 200k is transferred to the terminal 1102 through the firewall 1108.

It is assumed that, after S1204, the real IP address of the server 1104 has been changed from BBB to B'B'B' (S1205).

Then, the IP address change detection unit 406 of the server 1104 detects the change of the IP address and updates the values of the real source IP address and the previous real source IP address in the connection information storage unit 402 of the server 1104. With this update, the information in the connection information storage unit 402 of the server 1104 becomes as follows:

Authentication key: SKEY
Real destination IP address: CCC
Real source IP address: B'B'B'
Previous real source IP address: BBB
Virtual destination IP address: XXX
Virtual source IP address: YYY
Node type: SERVER The IP packet process unit 404 of the server 1104 generates a change notification packet 300g and transmits it to the network 1106 (S1206). The real IP address before the change BBB is set as the source IP address of the header portion 302 of the change notification packet 300g, the real IP address AAA of the terminal 1102 is set as the destination IP address thereof, and the real IP address after the change B'B'B' is accommodated in the data portion 312.

The firewall 1108 having received the change notification packet 300g detects that the source IP address and the destination IP address of the packet 300g match the combination of the destination and the source of the existing communication entry 1250, and allows the packet 300g to enter the internal network (S1207). With this operation, the terminal 1102 receives the change notification packet 300g.

The IP packet process unit 404 of the terminal 1102 having received the change notification packet 300g determines that the virtual destination and source IP addresses and the authentication key of the packet 300g match the corresponding values stored in the connection information storage unit 402. When the match is determined, the value of the item "real destination IP address" in the connection information storage unit 402 of the terminal 1102 is updated with the value of the IP address after the change included in the data portion 312 of the packet 300g. With this update, the information in the terminal 1102 becomes as follows:

Authentication key: SKEY
Real destination IP address: B'B'B'
Real source IP address: AAA
Previous real source IP address: not set
Virtual destination IP address: YYY
Virtual source IP address: XXX
Node type: CLIENT After this update, when the application 408 of the terminal 1102 transmits data to the application 408 of the server 1104, the IP packet process unit 404 of the terminal 1102 performs encapsulation by using the updated information in the connection information storage unit 402. Thus, the IP packet process unit 404 sends out a data packet **200*l* having the real IP address after the change B'B'B' of the server 1104 as the destination IP address of the header portion 202 (S1208). The firewall 1108 generates and caches a new communication entry 1260 having "B'B'B': pB" as the destination and "AAA: pA" as the source when the firewall 1108 allows the data packet 200*l* to pass. The data packet 200*l* sent from the firewall 1108 to the network 1206 is received by the server 1104**.

When the server 1104 having received the data packet **200*l* generates the data packet responding thereto, though the depiction thereof is omitted, the value of the real source IP address BBB in the connection information storage unit 402 is set as the source IP address of the header portion 202. Since the destination and source IP addresses of the header portion 202 of this response packet match the communication entry 1260, the response packet reaches the terminal 1102 through the firewall 1108**.

Thus, even when the real IP address of the server 1104 is changed during the continuation of the communication session, it follows that the communication session is continued.

Figure 13:
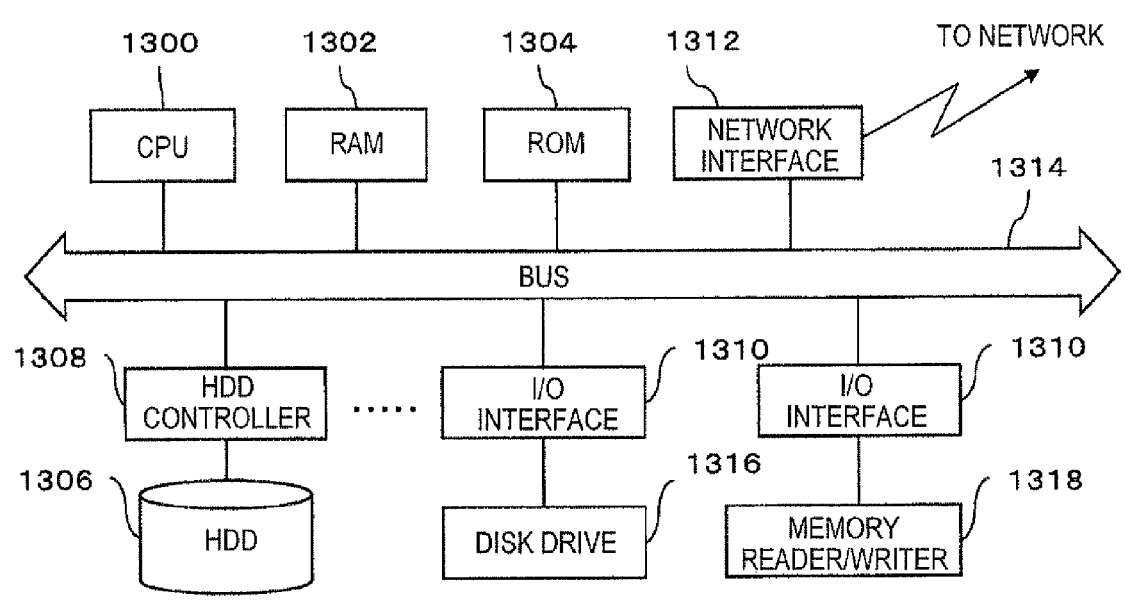
FIG. 13 is a view showing an example of a hardware configuration of a computer.

The terminals 102, 502, 702, 902, and 1102 and the servers 104, 504, 704, 904, and 1104 in the individual examples described above are implemented by, e.g., causing a general-purpose computer to execute a program describing the process of each of the functional modules described above. As shown in FIG. 13, the computer has, e.g., a circuit structure in which a microprocessor such as a CPU 1300 or the like, memory devices (primary storage) such as a random access memory (RAM) 1302 and a read only memory (ROM) 1304, a HDD controller 1308 for controlling a HDD (Hard Disk Drive) 1306, various I/O (input/output) interfaces 1310, a network interface 1312 which performs the control for the connection with a network such as a local area network or the like are connected with one another as hardware via, e.g., a bus 1314. To the bus 1314, for example, a disk drive 1316 for reading and/or writing from/to a portable disk recording medium such as a CD or a DVD, a memory reader/writer 1318 for reading and/or writing from/to portable nonvolatile recording media of various specifications such as a flash memory and the like may be connected via the I/O interfaces 1310. The program in which the content of the process of each functional module exemplified above is described is retained in a fixed storage device such as the hard disk drive or the like by way of the recording medium such as the CD or the DVD, or by way of a communication unit such as the network or the like, and is installed in the computer. The program stored in the fixed storage device is read by the RAM 1302 and executed by the microprocessor such as the CPU 1300 or the like, whereby a group of functional modules exemplified above are implemented. A part or all of the functional modules may be constructed as a hardware circuit such as a custom LSI (Large Scale Integration), an ASIC (Application Specific Integrated Circuit), a FPGA (Field Programmable Gate Array), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor;
a memory coupled to the processor, the memory storing instructions to be executed by the processor;
an IP address change detection unit configured to detect a change of a real IP address of the information processing apparatus; and
a change notification packet generation section and transmission section configured to generate, when the IP address change detection unit detects the change of the real IP address of the information processing apparatus during communication with a communication partner, a change notification packet, and configured to transmit the generated change notification packet to the communication partner, wherein
the change notification packet includes a first header portion and a first data portion,
the first data portion including a second header portion and a second data portion,
the change notification packet generation section is configured to determine a stored node type value of the information processing apparatus, and
when the stored node type value indicates that the information processing apparatus is a server,
the first header portion includes a real IP address before the change as a source IP address, and
the second data portion includes a real IP address after the change, and
when the stored node type value indicates that the information processing apparatus is a terminal,
the first header portion includes the real IP address after the change as the source IP address, and
the second data portion is empty, and
the IP address change detection unit, the change notification packet generation section, and the transmission section are stored in the memory.

2. The information processing apparatus of claim 1, wherein
each of the information processing apparatus and the communication partner is assigned a fixed virtual IP address at least during the communication between the information processing apparatus and the communication partner,
the change notification packet generation section and transmission section generates the change notification packet including a third header portion and a third data portion where the third header portion includes the real IP address before the change as the source IP address,
the third data portion includes a fourth header portion and a fourth data portion,
the virtual IP address of the information processing apparatus is included as the source IP address in the fourth header portion, and
the real IP address after the change is included in the fourth data portion.

3. A non-transitory computer readable medium storing a program causing a computer to execute a process for managing packets, the process comprising:
detecting a change of a real IP address of an information processing apparatus;
determining a stored node type value of the information processing apparatus;
generating, when the change of the real IP address is detected during communication with a communication partner, a change notification packet; and
transmitting the generated change notification packet to the communication partner,
wherein the change notification packet includes a first header portion and a first data portion,
the first data portion including a second header portion and second data portion, and
when the stored node type value indicates that the information processing apparatus is a server,
the first header portion includes the real IP address before the change as a source IP address, and
the second date portion includes a real IP address after the change, and
when the stored node type value indicates that the information processing apparatus is a terminal,
the first header portion includes the real IP address after the change as the source IP address, and
the second data portion is empty.

4. An information processing apparatus comprising:
a processor;
a memory coupled to the processor, the memory storing instructions to be executed by the processor;
a change notification reception section configured to receive a first change notification packet sent from a communication partner to the information processing apparatus when a chance of a real IP address of the communication partner is detected during a communication with the information processing apparatus, the first change notification packet including:
a first header portion and a first data portion,
the first data portion including a second header portion and a second data portion, and
when a communication partner is a server as indicated by a stored node type value of the communication partner,
the first header portion includes a real IP address before a change of the real IP address of the communication partner as a source IP address, and
the second data portion includes a real IP address after the change of the real IP address of the communication partner, and
when the communication partner is a terminal as indicated by the stored node type value of the communication partner,
the first header portion includes the real IP address after the change of the real IP address of the communication partner as the source IP address,
and the second data portion is empty; and
a destination application configured to set, when a packet is to be transmitted to the server communication partner after the change notification reception section receives the first change notification packet, the real IP address after the change of the communication partner included in the second data portion of the first change notification packet as a destination IP address included in a header portion of the packet, and
when a packet is to be transmitted to the terminal communication partner after the change notification reception section receives the first change notification packet, the real IP address after the change of the communication partner included in the first header portion of the first notification packet as a destination IP address included in a header portion of the packet,
wherein the change notification reception section and the destination application are stored in the memory.

5. The information processing apparatus of claim 4, further comprising:
an IP address change detection unit configured to detect the change of a real IP address of the information processing apparatus; and
a first change notification packet generation section and transmission section configured to generate, when the IP address change detection unit detects the change of the real IP address of the information processing apparatus during communication with the communication partner, a second change notification packet, and configured to transmit the generated second change notification packet to the communication partner, wherein
the second change notification packet includes a header portion,
the real IP address of the information processing apparatus after the change is included as a source IP address of the header portion of the second change notification packet, and
the IP address change detection unit, the first change notification packet generation section, and the transmission section are stored in the memory.

6. The information processing apparatus of claim 5, further comprising:
a second change notification packet generation section and transmission section configured to generate a third change notification packet, and configured to transmit the generated third change notification packet to the communication partner when a response from the communication partner is determined to be lost, wherein
the third change notification packet includes a header portion,
the real IP address of the information processing apparatus is included as the source IP address in the header portion of the third change notification packet, and
the second change notification packet generation section and the transmission section are stored in the memory.

7. A non-transitory computer readable medium storing a program causing a computer to execute a process for managing packets, the process comprising:

receiving a first change notification packet sent from a communication partner to the computer when a change of a real IP address of the communication partner is detected during a communication with the computer, wherein the first change notification packet includes:

a first header portion and a first data portion, the first data portion including a second header portion and a second data portion, and when the communication partner is a server as indicated by a stored node type value of the communication partner,
 the first header portion includes a real IP address before a change of the real IP address of the communication partner as a source IP address, and
 the second data portion include a real IP address after the change of the real IP address of the communication partner, and when the communication partner is a terminal as indicated by the stored node type value of the communication partner,
 the first header portion includes the real IP address after the change of the read IP address of the communication partner as the source IP address,
 and the second data portion is empty; and setting, when a packet is to be transmitted to the server communication partner after receiving the first change notification packet, the real IP address after the change of the communication partner included in the second data portion of the first change notification packet as a destination IP address included in a header portion of the packet, and setting, when a packet is to be transmitted to the terminal communication partner after receiving the first change notification packet, the real IP address after the change of the communication partner included in the first header portion of the first notification packet as a destination IP address included in a header portion of the packet.

8. An information processing system comprising:

a first information processing apparatus; and a second information processing apparatus, the first information processing apparatus including:
 a first processor;
 a first memory coupled to the first processor, the first memory storing instructions to be executed by the first processor;
 an IP address change detection unit configured to detect a change of a real IP address of the first information processing apparatus; and
 a change notification packet generation section and transmission section configured to generate, when the IP address change detection unit detects the change of the real IP address of the first information processing apparatus during communication with the second information processing apparatus, a change notification packet, and configured to transmit the generated change notification packet to the second information processing apparatus, wherein the change notification packet includes a first header portion and a first data portion,
 the first data portion including a second header portion and a second data portion, the change notification packet generation section is configured to determine a stored node type value of the first information processing apparatus, and when the stored node type value indicates that the first information processing apparatus is a server,
 the first header portion includes the real IP address before the change as a source IP address, and
 the second data portion includes a real IP address after the change, and when the stored node type value indicates that the first information processing apparatus is a terminal,
 the first header portion includes the real IP address after the change as the source IP address, and
 the second data portion is left empty, and the IP address change detection unit, the change notification packet generation section, and the transmission section are stored in the first memory, and the second information processing apparatus including:
 a second processor;
 a second memory coupled to the second processor, the second memory storing instructions to be executed by the second processor;
 a change notification reception section configured to receive the change notification packet including the real IP address before the change of the first information processing apparatus and the real IP address after the change in the data portion from the first information processing apparatus; and
 a destination application configured to set, when a packet is to be transmitted to the first information processing apparatus after the change notification reception section receives the change notification packet during the communication with the first information processing apparatus, the real IP address after the change of the first information processing apparatus included in the change notification packet as a destination IP address in the header portion of the packet, wherein the change notification reception section and the destination application are stored in the second memory.

* * * * *